United States Patent [19]
Dubrovsky

[11] Patent Number: 5,238,662
[45] Date of Patent: Aug. 24, 1993

[54] PROCESSES FOR RECOVERING PRECIOUS METALS

[75] Inventor: Michael Dubrovsky, Berkeley, Calif.

[73] Assignee: Chevron Research Company, San Francisco, Calif.

[21] Appl. No.: 880,876

[22] Filed: May 11, 1992

Related U.S. Application Data

[63] Continuation of Ser. No. 477,419, Feb. 9, 1990, abandoned, which is a continuation-in-part of Ser. No. 80,023, Jul. 31, 1987, abandoned, which is a continuation-in-part of Ser. No. 123,746, Nov. 23, 1987, abandoned.

[51] Int. Cl.$^5$ .................... C01G 7/00; C01G 55/00
[52] U.S. Cl. ........................ 423/27; 423/22; 423/39; 423/38; 423/40; 423/48; 75/633; 75/632; 75/637; 75/736; 75/744
[58] Field of Search .............. 423/22, 27, 33, 38, 423/39, 40, 46, 48, 94, 147, 154, 210.5; 75/628, 638, 633, 637, 739, 744, 726, 632, 736

[56] References Cited

U.S. PATENT DOCUMENTS

| | | | |
|---|---|---|---|
| 2,035,016 | 3/1936 | Simcox et al. | 423/48 |
| 4,011,146 | 3/1977 | Coltrinari et al. | 204/66 |
| 4,188,362 | 2/1980 | Edwards et al. | 423/22 |
| 4,209,501 | 6/1980 | Kruesi | 423/491 |
| 4,323,541 | 4/1982 | Saarinen et al. | 423/37 |
| 4,353,740 | 11/1982 | Dunn | 75/423 |
| 4,397,689 | 8/1983 | Lea et al. | 423/40 |
| 4,420,380 | 12/1983 | Ducati | 204/66 |
| 4,612,175 | 9/1986 | Holmstrom | 423/22 |
| 4,642,134 | 2/1987 | Van Antwerp | 75/744 |
| 4,828,809 | 5/1989 | Thomassen et al. | 423/46 |

FOREIGN PATENT DOCUMENTS 6127832 6/1986 Japan ......................... 423/40

OTHER PUBLICATIONS

International Application Published Under the PCT. Publication No. WO85/01748, April 1985.

*Primary Examiner*—Theodore Morris
*Assistant Examiner*—Edward Squillante
*Attorney, Agent, or Firm*—M. L. Davis; R. J. Sheridan; W. K. Turner

[57] ABSTRACT

Disclosed is a process for recovering precious metals using a combination of smelting and an effective utilization of molten salt chlorination. More specifically, disclosed is a process including the steps of (i) contacting, for example, a matte with a chloride salt containing at least one of potassium, cesium or rubidium, but not sodium or lithium to form a matte/salt solids mixture, (ii) introducing the solids mixture into a chloride melt having a temperature ranging from 300° C. to 650° C., said melt containing at least one of potassium, cesium, rubidium, sodium or lithium, (iii) introducing a chlorine containing gas into the melt, and (iv) maintaining the salt ratio in the matte/salt mixture at a stoichiometrically equivalent amount with the precious metals and base metals contained in the matte. Also disclosed is a selective dissolution technique which involves multiple dissolution stages wherein each stage the oxidation potential is maintained at a certain level and an alkali metal chloride is added such that platinum and palladium can be separately recovered.

29 Claims, 2 Drawing Sheets

PROCESSES FOR RECOVERING PRECIOUS METALS

This is a continuation of application Ser. No. 477,419, filed Feb. 9, 1990, now abandoned, which is a Continuation-in-part of U.S. application Ser. Nos. 80,023, filed Jul. 31, 1987, now abandoned, and 123,746, filed Nov. 23, 1987, now abandoned.

BACKGROUND OF THE INVENTION

The present invention relates to a process for the recovery of precious metals from sulfide concentrates or mattes, particularly those containing nickel sulfides. More specifically, the process of the present invention relates to the conversion of precious metals, metal sulfides and nickel sulfides to metal chlorides, and the subsequent recovery of the precious metals and nickel.

Precious metal ores that contain platinum group metals (PGMs) are usually associated with sulfide minerals of copper, nickel, and iron. Typically, these ores have been smelted to separate the sulfide minerals from the gangue. That is, upon smelting, the sulfide minerals and the precious metals collect in a separate molten phase known as matte while gangue is separated as a molten slag. After smelting, the slag is discarded and the matte is cooled, crushed, ground, and leached to remove the base metals. U.S Pat. No. 4,571,262 describes the use of sulfuric acid to leach the matte. This process is known as the Sherritt Gordon process. Canadian Patent No. 970,980, describes the use of hydrochloric acid and chlorine for leaching the matte. This process is known as the Falconbridge chlorine leach process.

The remaining solid residue from the leaching process (often referred to as PGM concentrates), is further treated to recover precious metals. Typically, PGM concentrates are subjected to another leaching step that converts the precious metals to soluble chlorides which then can be refined to pure metals.

Unfortunately, such processes suffer from several major disadvantages. For example, during the leaching of the base metals some of the precious metals are also extracted and an additional step is needed for their recovery from solutions that are rich in base metals. Also, the PGM residue is impure. It contains large quantities of base metals, elemental sulfur and harmful impurities such as arsenic, antimony, selenium, tellurium, bismuth and tin. These impurities end up in the PGM chloride solutions and render it very difficult to refine the PGMs to pure metals. For example, selenium and tellurium impurities are known to react with various organic solvents that are used in the multiple solvent extraction stages in PGM refining operations. This usually causes the formation of an organic "crud" that entraps PGMs, disrupts the solvent extraction and causes losses in PGMs. Bismuth and antimony are difficult to separate from precious metal products and cause loss of purity.

Also, the PGM concentrates (the first leach residue) are not homogeneous materials. Concentrates of PGMs including gold and silver, can be characterized as those which are generally soluble, i.e., platinum, palladium and gold, and those that are generally insoluble, i.e., rhodium, iridium, ruthenium, osmium and silver (rhodium, iridium, ruthenium and osmium are often referred to as "secondary PGMs"). Thus, when PGM concentrates are subjected to leaching, platinum and palladium dissolve while the secondary PGMs remain insoluble. The residue which is rich in secondary PGMs is normally resmelted and dissolved in an additional leaching step. The recovery of secondary PGMs and the special processing that it requires is described in U.S Pat. No. 4,397,689. Unfortunately, there is not a complete split between soluble and insoluble metals. For example, some platinum remains undissolved and is found in the insoluble stream and some ruthenium may dissolve and is found in the soluble stream.

All of the above difficulties render conventional PGM processing tedious, long and complex. Also, the fact that gold dissolves with precious metals is troublesome since it must be completely removed before the separation and refining of the PGMs.

Metals within sulfide ores have also been recovered by chlorination. Generally, metals recovery processes that employ chlorination reactions can be classified in three groups, namely gaseous chlorination, salt chlorination (in the absence of chlorine gas), and chlorination in a molten salt bath in the presence of chlorine gas. In this regard, U.S. Pat. Nos. 4,011,146 and 4,362,607 describe gaseous chlorination processes, U.S. Pat. No. 1,883,234 describes chlorination by salt addition, and U.S. Pat. No. 4,209,501 describes a molten salt extraction processes. U.S. Pat. Nos. 4,353,740, 3,825,651, 3,988,415, and 4,209,501 describe the use of chlorination for precious metals recovery.

As explained in H. Parson's "Low Temperature Dry Chlorination of Sulfide Ores—A Review," CIM Bull. Vol. 71, 196 (March 1978), the reaction between chlorine gas and metal sulfides has been known at least since the early part of the century (see also U.S. Pat. No. 1,388,086 issued Aug. 16, 1921). Many researchers have since tried to create commercial processes, hoping that gaseous chlorination would enable them to treat complex sulfide ores, produce elemental sulfur, and use less energy.

However, there are problems inherent in gaseous chlorination processes. For example, precious metals and especially PGMs are difficult to chlorinate at high yields. Also, when other metal sulfides chlorinate it is difficult to separate between the numerous metal chloride products. In addition, the metal chlorides fuse with the solid residue and cause plugging of the chlorination reactor, and sulfur chlorides form. Furthermore, both the metal chloride and the sulfur vapors are difficult to separate and recover, the reaction produces large volumes of gases which cause large losses of concentrate dust, there is poor recovery yield, and the equipment corrodes. Because of these reasons, precious metals ores that contain other sulfides are often first roasted prior to chlorination. The roasting removes sulfur and converts base metal sulfides to metal oxides that do not chlorinate readily. In this way the problems associated with the separation of sulfur from chloride vapors, the separation of chloride products and the fusion of large quantities of base metal chlorides in the reactor are eliminated. U.S Pat. No. 4,353,740 describes such a procedure for treating gold ores. A similar procedure for the extraction of PGMs is described by the Council for Mineral Technology, private Bag *3015, Randburg, 2125 South Africa in their special publication No. 12 1987 compiled by A. M. Edwards and M. H. Silk. In that publication a chlorination process is described which was developed by Rand Mines (South Africa) and used by Potgiestersrust mines (1930) in which a sulfide rich platinum concentrate was roasted and then chlorinated in the presence of salt to form soluble PGM chlorides. The overall yield of PGMs from this step was 85%. While in 1930 this level of PGM recovery was apparently satisfactory, it is totally unacceptable today.

As is evident from U.S. Pat. No. 589,959 issued Sep. 14, 1887, chlorination with salt in the absence of chlorine gas, dates back to the 19th Century. However, these processes are also often ineffective. For example, the processes use high temperatures, usually ranging from 900° to 1000° C., and have high energy requirements. Furthermore, at these high temperatures the metal chlorides are volatilized and gas scrubber systems are required for their subsequent recovery.

The use of a molten salt bath process has the potential to be advantageous. However, the prior art processes have experienced problems. For example, sulfur monochloride often forms and certain metal chlorides are volatilized from the bath and their vapors mix with sulfur vapors and sulfur monochloride Copper and iron chlorides are typical examples of affected base metal chlorides while all of the precious metal chlorides are highly volatile. U.S. Pat. No. 4,209,501 describes the evaporation of gold from a molten salt bath.

In addition, in the chlorination of nickel containing matte the rates of reaction have been slow and yields have been low. Low yields, of course, are particularly unacceptable when precious metals are involved. To be practical, at least 98%, preferably $\geq 99\%$, of the precious metals should be recovered.

Those mattes containing nickel sulfides have been particularly difficult to chlorinate in chloride melts. For example, U.S. Pat. No. 3,802,870 shows that during chlorination of a nickel sulfide containing matte in a molten salt bath at a temperature ranging from 750° C. to 950° C., the other sulfides in the matte are chlorinated, but not the nickel sulfides. Thus, this type of process must be operated at high temperatures to maintain the nickel containing matte in a molten state.

SUMMARY OF THE INVENTION

Accordingly, it is a primary object of the invention to provide an improved process for recovering precious metals from ores such as sulfide containing ores.

It is a further object of the invention to provide an improved process for recovering precious metals from matte, which is less complex and more efficient than the prior art smelting-type processes.

It is a further object of the invention to provide for such a process which can be effective for treating nickel containing matte, yet be run at lower temperatures than the prior art processes.

It is even a further object of the invention to provide a process in which precious metals, including nickel, can be chlorinated at high yields, fast rates, and low temperatures, and without losing the precious metals due to volatilization or sublimation.

It is also an object of the invention to provide a method for selective recovery of the metals following chlorination.

Furthermore, it is object of the invention to provide efficient removal of arsenic, antimony, selenium, tellurium and bismuth impurities.

Even a further object of the invention is to provide a process which effectively dissolves more than 99% of the platinum and palladium and more than 99% of the secondary PGMs in one step.

The aforementioned objects of the invention, as well as others not specifically enumerated above, can be obtained by a process for recovering precious metals using a combination of smelting and an effective utilization of molten salt chlorination. More specifically, the objects can be obtained by (i) contacting, for example, a matte with a chloride salt containing at least one of potassium, cesium or rubidium, but not sodium or lithium to form a matte/salt solids mixture, (ii) introducing the solids mixture into a chloride melt having a temperature ranging from 300° C. to 650° C., said melt containing at least one of potassium, cesium, rubidium, sodium or lithium, (iii) introducing a chlorine containing gas into the melt, and (iv) maintaining the salt ratio in the matte/salt mixture at a stoichiometrically equivalent amount with the precious metals and base metals contained in the matte.

In another aspect of the invention, the salt contains potassium chloride, and preferably a mixture of potassium chloride and magnesium chloride.

In even another aspect of the invention the matte is a ground converter matte, preferably one obtained from a sulfide ore containing nickel.

A further aspect of the invention involves th addition of an iron chloride promoter to enhance precious metal recovery.

Another aspect of the invention is directed to a novel selective dissolution technique which involves multiple dissolution stages wherein platinum and palladium can be separately recovered. There is also provided a selective precipitation technique that can be used in place of the selective dissolution technique. Selective precipitation can be used if, for example, a ground melt is first dissolved. In such a situation, the PGMs are selectively precipitated from the solutions and platinum and palladium are thereafter separately recovered.

While the invention will be described below in connection with preferred embodiments thereof, it will be understood that this description is not intended to limit the invention to those embodiments. To the contrary, it is intended to cover all alternatives, modifications, and equivalents as may be included within the spirit and scope of the invention as defined by the appended claims.

DETAILED DESCRIPTION OF THE PREFERRED EMBODIMENTS

In a preferred embodiment, the process can be carried out by preparing a chloride melt with chloride salts containing at least one of potassium, cesium, rubidium, sodium or lithium, and one alkaline earth metal chloride or zinc chloride, but not ammonium chloride. The melt is then brought to a temperature ranging from about 300° C. to about 650° C. A solids mixture of matte and at least one alkali salt containing at least one of potassium, cesium or rubidium, but not sodium or lithium is introduced into the melt, followed by the introduction of a chlorine containing gas into the melt. Alkali salts of potassium, cesium and rubidium, but not sodium or lithium are continuously added, as needed, during chlorination. The rate at which these salts are added is such that the amount of added free alkali is maintained essentially stoichiometrically equivalent to the amount of base and precious metals that are present in the matte. The melt can then be cooled to room temperature, crushed and ground. Afterwards the ground melt can be dissolved and the precious metals recovered.

Thus, in the most simplistic terms, one aspect of the invention involves the conversion of precious metals, preferably those contained in matte, to chlorides. As chlorides, they can be readily and efficiently recovered and purified in subsequent steps. For the best understanding of this aspect of the invention, reference should be made to the schematic diagram set forth in FIG. 1.

For purposes of this invention, platinum group metals (PGMs) include platinum, palladium, rhodium, iridium, ruthenium, and osmium. Precious metals are defined as the PGMs plus gold and silver. Furthermore, while the present invention is particularly effective (and surprisingly so) for treating matte, it is also effective for treating ore concentrates, scrap metal and various precious metal residues from hydrometallurgical operations (e.g., matte leaching).

The types of ores which can be treated by the process of the present invention are those in which precious and platinum group metals are found in sulfidic or elemental states. They can be mixed with iron or copper sulfides, oxides, or silicates and ores containing compounds of these metals. Preferably, prior to the molten salt chlorination, the sulfide ore has been smelted, producing a gangue phase and a matte phase containing precious metals, copper, nickel, and iron sulfides. The matte phase is then treated in a converter to remove the iron, cooled, crushed, and then ground. After grinding the matte it is introduced into an autoclave to remove copper and nickel and to produce a matte residue enriched in gold and PGMs. Minerals which can be treated in accordance with the process of the present invention include pentlandite, pyrrhotite, chalcopyrite, bornite, chalcocite, covellite, cubanite, pyrite, arsenopyrite, sphalerite, galena, millerite, niccolite, stannite, argentite, alabandite, molybdenite, stibnite, pyrargyrite, enargite, calaverite, etc.

An important aspect of the present invention rests in the recognition that unexpectedly superior results can be obtained with a correct choice of the alkali metal salt to be added to the precious metal source to form the solids mixture which is added to the melt, and for maintaining stoichiometry. Alkali metal salts would generally be considered to be those containing the alkali metals of lithium, sodium, potassium, rubidium and cesium from Group IA of the Periodic Table of Elements. However, for purposes of forming the solids mixture and for maintaining stoichiometry, preferably only those salts containing potassium, rubidium, cesium, and mixtures thereof, preferably those containing potassium, are used. These salts provide the best chloride complex; less salt can be used, and the salts do not have an adverse effect in terms of downstream leaching and precipitation. In situations where these factors are not a high priority, however, some of the objects of the invention can still be obtained while using the alkali metal salts of sodium and lithium.

While not wishing to be bound by theory, the importance of selecting the appropriate alkali metal is due to a number of factors. With precious metals recovery it is essential to get as high recovery of these metals as possible because of the value of the metals. Generally it is considered that a precious metal recovery process should provide a recovery of at least 98%, preferably $\geq 99\%$, of the precious metals. In contrast, a process which provides a recovery, for example, of as high as 90% would still be unacceptable.

Therefore, during chlorination it is necessary to provide a stable alkali chloride that reacts with the precious metals and base metals and forms a stable chloride complex, such that enhanced reactivity can be obtained and the volatility of the metals (resulting in the loss of metals) can be reduced.

It has been discovered that the preferred salts to be used for purposes of forming the solids mixture and for maintaining stoichiometry, i.e., those salts containing potassium, rubidium, cesium, and mixtures thereof, are particularly effective in obtaining these goals. If lithium and sodium salts are used, the success of the precious and base metal recovery will be limited. In addition, it was discovered that the presence of sodium and/or lithium salts interferes with subsequent steps of selective leaching or selective precipitation of th precious metals.

As noted above, the solids mixture of salt and the precious metal source is added to a chloride melt. The melt contains at least one of potassium, cesium, rubidium, sodium or lithium. Further research has shown the particularly effective results can be obtained when the alkali metal salt is potassium chloride, and is used in a mixture with magnesium chloride.

If a mixture of potassium chloride and magnesium chloride is used such a mixture should contain about 20% to about 80%, preferably about 50% to about 61%, potassium chloride.

The solids mixture of salt and precious metal containing source (e.g., matte) is introduced into a reaction vessel containing the melt. Maintaining a proper ratio of matte to salt is important to achieve high metals recovery, to enhance reactivity of metal sulfides towards chlorination, to lower the metal chloride vapor pressures and to ease process handling. Insufficient salt can create a loss of recovery, loss of reactivity and loss of volatile metal chlorides overhead. Too much salt, however, can create a need for excess melting heat and the fluid melt may turn to a paste-like mixture which is difficult to stir.

Generally, four reactions of interest are indicative of those which occur during molten salt chlorination. Using potassium chloride as an example of the salt and wherein M represents a precious metal and x is a stoichiometric value, the reactions are set forth below:

$$MS + Cl_2 \rightarrow MCl_2 + S \qquad (i)$$

$$MCl_2 + 0.5Cl_2 \rightarrow MCl_3 \qquad (ii)$$

$$MCl_2 + xKCl \rightarrow KMCl_3 + (x-1)KCl \qquad (iii)$$

$$MCl_3 + xKCl \rightarrow KMCl_4 + (x-1)KCl \qquad (iv)$$

It is an important aspect of the invention that during chlorination, a certain value of x be maintained. Otherwise chlorination can be sluggish, ultimately resulting in reduced recovery. The value x should be about 1 to 2 for dichlorides (reaction (iii)) and 1 to 3 for the trichlorides (reaction (iv)), to enhance reactivity and suppress volatility due to greater stability of the complex. Therefore, throughout chlorination, salt should be added to maintain the stoichiometry of the reactions.

In the chlorination reaction vessel, the matte/salt mixture is suspended in the molten salt bath and contacted with a chlorine-containing gas, preferably in the absence of oxygen. The chlorine containing gas is preferably 100% chlorine gas. However, chlorine-containing compounds such as carbon tetrachloride, sulfur monochloride, hydrogen chloride, etc. can also be present. The amount of chlorine gas to be added is at least stoichiometrically equal to the amount of sulfidic sulfur in the ore concentrate. It is important to add enough chlorine to overchlorinate all the reactive metal sulfides and elemental metals, because the precious metals will form precious metal chlorides only after substantially all the metal sulfides have been converted. Otherwise, precious metal chlorides will convert back to precious metals sulfides upon contact with other metal sulfides.

During chlorination the temperature is preferably maintained between 300° C. (572° F.) and 650° C. (1022° F.), more preferably between 350° C. and 550° C., depending on the matte/salt mixture. These temperatures are generally lower than those used in prior art processes which tend to volatilize metal chlorides.

The matte/salt mixture fed into the molten salt bath will typically form a molten slurry at the process temperatures. Preferably, at least 40% of the liquid melt is liquid, more preferably, at least 50% is liquid, and most preferably at least 60% is liquid. It is important to provide enough salt along with the matte to react the precious metals and the base metals with the salt and chlorine to form stable chloride complexes. During chlorination, it is also important to keep enough liquid melt in the molten salt reactor so that it can be stirred easily. This is difficult to achieve if the amount of liquid melt in the reactor drops below 40%.

In a preferred embodiment of the invention, the matte contains an amount of at least about 0.1% iron and about 0.1% copper by weight, preferably 0.1% to less than 20% iron and 0.1% to less than 30% copper, and most preferably from about 5% to about 15% of iron and 5% to 15% of copper. If the matte does not contain enough iron or copper, they can be added in appropriate amounts to the matte feed in the form of iron and copper sulfide minerals. Suitable minerals are pyrrhotite, chalcocite, chalcopyrite, covellite, bornite and digenite. Alternatively, the copper and iron promoters can be added directly to the molten salt bath as anhydrous metals chlorides. In this embodiment, the content of iron or copper chloride in the melt should be at least 0.1% by weight of the overall melt, preferably from about 0.1% to less than 15%, and most preferably from about 5% to about 10%. This alternative is less preferred, however, because anhydrous chlorides are expensive.

In the past, various metal chlorides have been added to enhance the chlorination process, usually in relatively large amounts. For example, U.S. Pat. No. 4,209,501 describes the addition of at least 15% of iron chloride or copper chloride. It has been unexpectedly discovered that the addition at least 0.1% of iron chloride enhances the process of the present invention. It is not, however, necessary to add large amounts of iron chloride, such as 15%. Furthermore, it was unexpectedly discovered that PGMs and gold are not as effectively extracted by chlorination in chloride melts containing a copper chloride additive. Chlorination is somewhat slower and recoveries of PGMs are often unacceptable. Thus, unlike the process described in U.S. Pat. No. 4,209,501, copper chloride is not as effective in this capacity in the present invention.

The iron chloride promoter (or the easier to chlorinate iron sulfides which are converted quickly to metal chlorides) assists in precious metal chlorination.

The present invention has been found to be particularly effective because when potassium, cesium and rubidium chlorides are used according to the invention, substantially all of the precious metals are retained in the melt for subsequent processing while most of the impurities are volatilized, thereby increasing precious metal recovery. That is, substantially all of the precious metals are concentrated in a single process stream. Some prior art methods intentionally or unintentionally volatilize some of the precious metal chlorides from the melt which results in their distribution in several process streams. This makes the precious metal recovery more complex and results in reduced extractions. In this regard, the use of the aforementioned salts according to the present invention is believed to reduce the volatility of the precious metals thus keeping them only in the melt and ensuring that substantially all of the precious metals will be concentrated in one process stream. Similarly, the salts are believed to reduce the volatility of the promoter metal chlorides thus maintaining them in contact with the metal sulfides and elemental metals that must be chlorinated.

The matte/salt mixture is chlorinated in a reactor. Preferably, the reactor has a means for introducing the chlorine-containing gas into the melt, a means to admit the matte/salt mixture, a means for stirring or mixing, a means for heating, a means for removal of gases and liquids, as well as all the necessary process control equipment that is known in the art. The stirring means is preferably capable of providing a dynamic environment for contact between the salt, elemental metals, metal sulfides, metal chlorides, and chlorine gas.

During chlorination, elemental sulfur is evolved and condensed. This is particularly advantageous over technologies which produce sulfur dioxide gas, because elemental sulfur can be easily stored and shipped. Solid sulfur does not pose an air pollution problem, as does sulfur dioxide. Furthermore, impurities advantageously evolve with the sulfur as chlorides and are removed from the matte/salt mixture. The impurities are not vented to the air. They are typically removed with the sulfur or are scrubbed out. An example of a suitable scrubber is one using an aqueous hydroxide solution such as an aqueous solution of alkali or alkaline earth metal hydroxides.

Examples of such impurities include arsenic, tellurium, antimony, selenium, bismuth and tin. Surprisingly, it was discovered that the aforementioned impurities, or their chlorides, are not effectively retained in the melt by the addition of the alkali salts according to the invention. As a result, there can be obtained a substantially complete separation between the desired precious metals and the impurities.

In order to obtain a commercially effective recovery of precious metals (e.g. $\geq 99\%$), the end point of chlorination should be monitored, and a suitably effective analytical technique should be employed. For example, during operation a sample can be taken of the melt from the molten salt chlorination reactor and dissolved in known amounts of a solution. The oxidation of the solution would then be measured. A melt sample which did not fully react, and was dissolved in water, will typically have, e.g., an oxidation potential of around 200 to 400 millivolts against a standard silver electrode. A sample in which the PGMs have been fully reacted will have an oxidation potential of around 450 to 500 millivolts, and a sample in which gold has been full dissolved will have an oxidation potential of around 600 to 700 millivolts. Of course, these values are not exact and may vary depending on the contents of the melt sample.

After substantially all the precious metals are formed into precious metal chlorides, they can be recovered by means known in the art, such as brine leaching.

Figure 1:
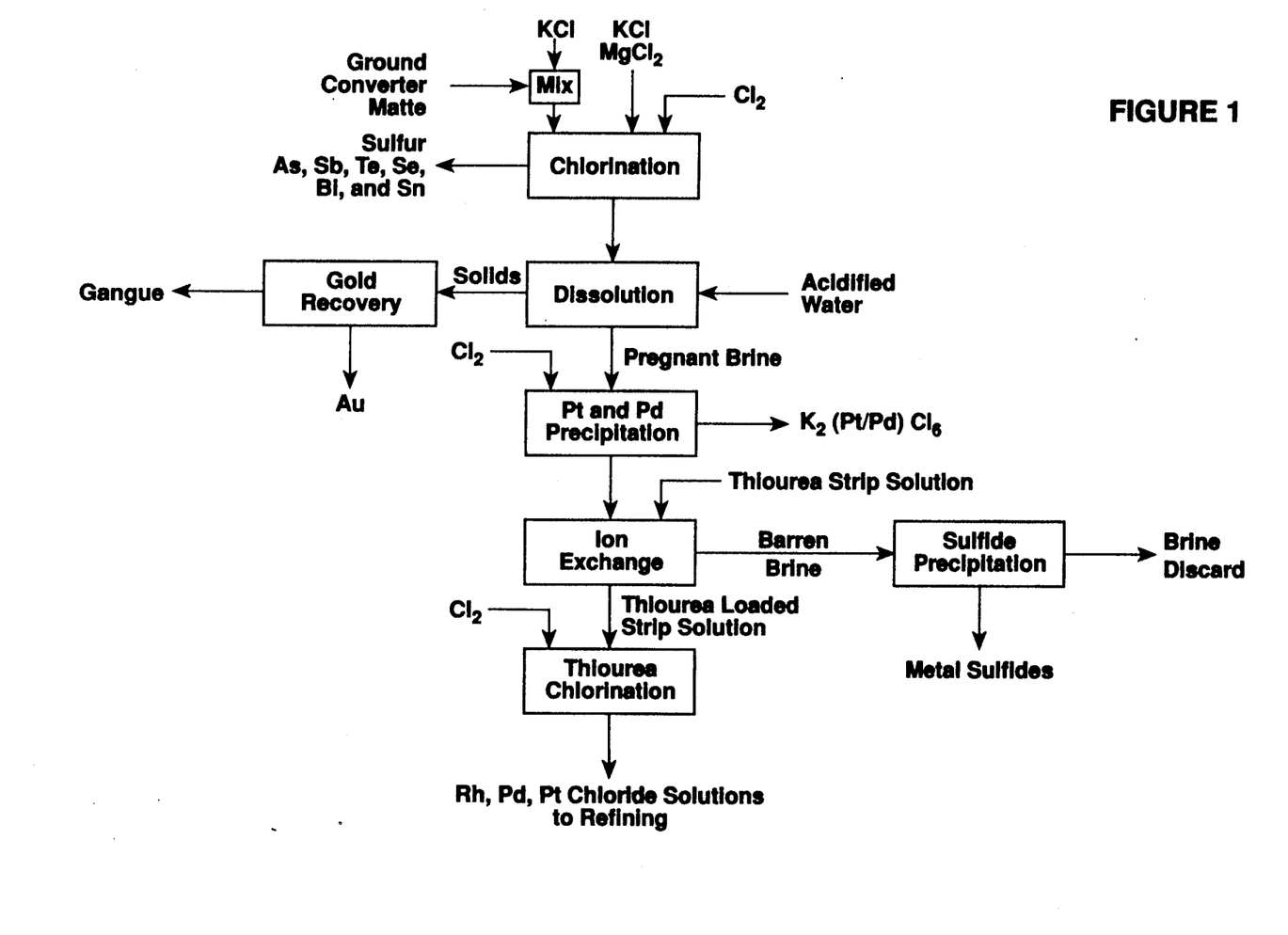
FIG. 1 is a schematic illustration of a molten salt chlorination process for recovering precious metals according to the invention.

Suitable subsequent processing is illustrated in the process flow diagram set forth in FIG. 1. The precious metal chloride containing product from molten salt chlorination can be subjected to aqueous leaching to produce a pregnant brine containing the precious metals. Platinum and palladium are then precipitated from the pregnant brine. The platinum and palladium containing precipitates can then be subjected to dissolution with acidified water and the solution passed to further metal refining operations.

Another embodiment of the invention involves a novel method for the recovery of PGMs from the pregnant brine. In essence, this aspect of the invention evolved from the discovery that by using potassium chloride in the molten salt chlorination operation, a selective and quantitative precipitation of PGMs chlorides from brine solutions can be easily accomplished.

Platinum and palladium are precipitated from the pregnant brine simply by raising the oxidation potential of the solution to around 1100 mv against a silver standard electrode. This can be done by injecting chlorine gas into the solution until the oxidation potential of the solution is raised to the range of around 900 mv to 1100 mv, or more, preferably around 1080 mv as measured against a standard calomel electrode. Most of the rhodium and iridium which is present will coprecipitate with the platinum and palladium precipitates.

It was discovered that molten salt chlorination produces PGM chlorides in their reduced forms. For example, the reduced species of palladium complexes is potassium chloropalladite salt ($K_2PdCl_4$) and that of the platinum complexes is the potassium chloroplatinite salt ($K_2PtCl_4$). Both of these species have appreciable solubility in aqueous solutions. On the other hand, the oxidized forms of the complexes, potassium chloropalladate ($K_2PdCl_6$) or platinate ($K_2PtCl_6$) are sparingly soluble. Thus, it was found that by injecting chlorine into the solutions the reduced species of the PGMs oxidize to the platinate form and precipitate almost quantitatively. Surprisingly, the OPMs, rhodium, iridium, osmium and ruthenium responded the same way and which allows for a complete separation of all of the PGMs from the base metals and other metal impurities in one simple step.

Following this procedure, a procedure was subsequently discovered to treat mixed PGM precipitates and separate them into a palladium rich precipitate and a platinum rich precipitate. It was found that by heating the PGM containing precipitates to about 450° C. (after filtering from the solution and drying), the potassium chloropalladate decomposed to the highly soluble potassium chloropallidite, while the platinum salt remained the insoluble potassium chloroplatinate. By using this characteristic of the palladium salt, it can be separated from the platinum by simply leaching the treated precipitates with acidified water. The palladium salts dissolve readily, and the platinum residue can be filtered from the palladium containing solution. The palladium in the new solution can be precipitated again using any conventional technique to form a shippable palladium rich precipitate. By this procedure, rhodium, iridium, osmium and ruthenium are more or less evenly distributed between the platinum and the palladium precipitates.

The brine from the platinum and palladium precipitation step will contain, for example, copper, iron, nickel and residual precious metals such as Rh, Pd, and Pt. The brine, as well as any waste filtrates, can then be treated using a selective ion exchange resin that extracts precious metals The preferred resin is one that has an isothiouronium functional group that selectively chelates precious metals such as PGMs, and gold. The following two resins are available commercially: Ionac SR-3 made by Sybron Chemicals Inc. of New Jersey and PAZ distributed by Sela Inc. of New York. Once the resin is fully loaded, the precious metals should be removed from the resin by stripping with concentrated thiourea solutions. The precious metals in the strip solution are present as thiourea complexes and should be converted back to the chloride form for refining. This can be done by injecting chlorine gas into the thiourea solutions at about 90° C. The reaction of chlorine with thiourea completely oxidizes the thiourea to nitrogen, carbon dioxide and hydrochloric acid and converts the precious metal thiourea complexes into chloride complexes which are more suitable for metal refining.

The brine from the ion exchange treatment, i.e., the barren brine loaded with e.g., copper, zinc and nickel, can then be subjected to sulfide or hydroxide precipitation. The sulfides or hydroxides of copper, zinc and nickel are then recovered and the brine discarded.

Figure 2:
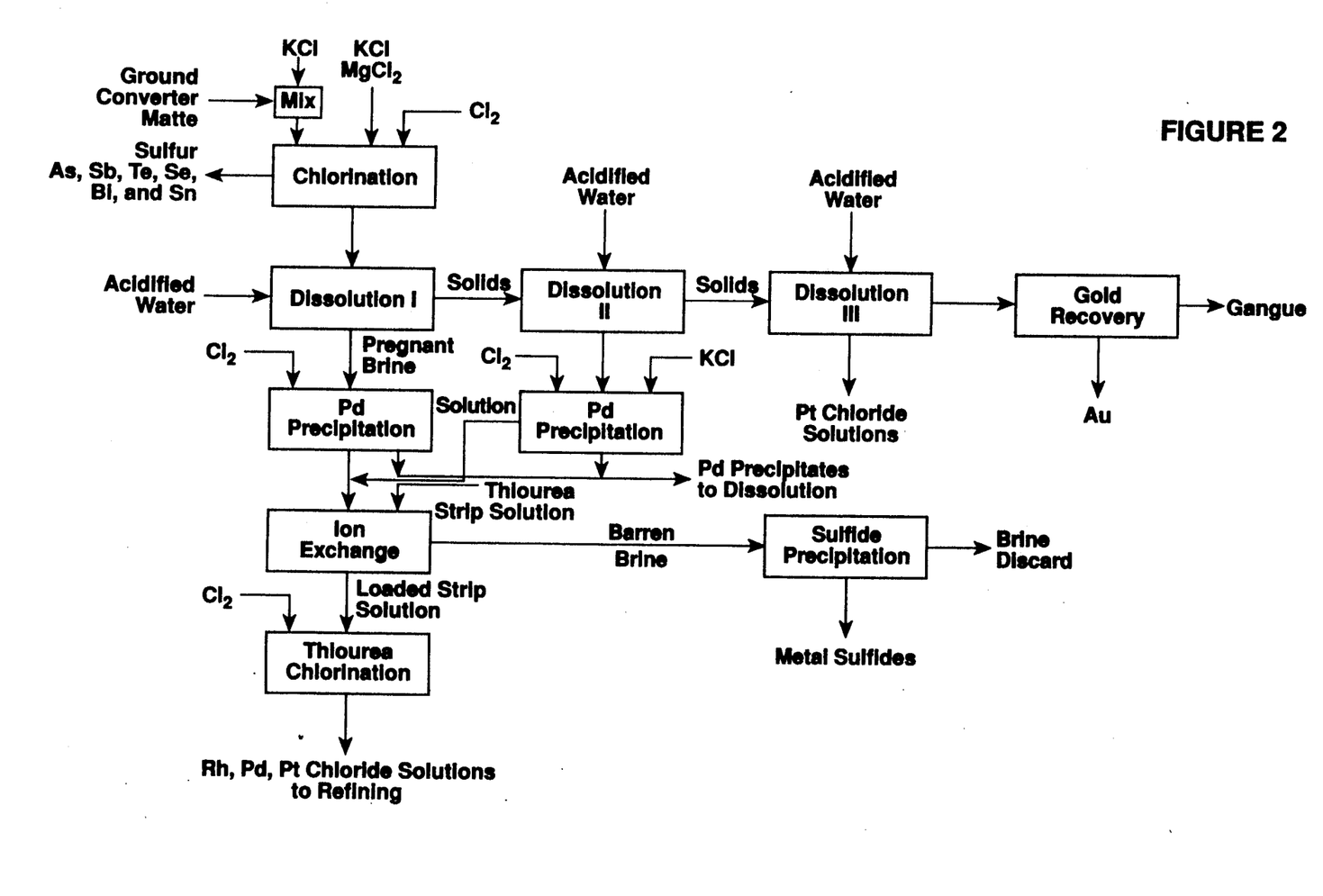
FIG. 2 is a schematic diagram of a preferred molten salt chlorination process according to the invention which includes the novel selective dissolution technique.

While the above method can be used effectively in conjunction with the molten salt chlorination process of the present invention to recover the precious metal chlorides, during the research efforts surrounding the aforementioned molten salt chlorination process, another novel recovery method was developed which provides unexpectedly effective results. This recovery method is incorporated in the process flow diagram set forth in FIG. 2.

In essence, this aspect of the invention also evolved from the discovery that potassium chloroplatinite (the reduced chloride complex) is sparingly soluble in saturated solutions of potassium chlorphalladites. It was discovered that by dissolving the solidified molten salt product in an appropriate amount of acidified water, the dissolution of all of the platinum precipitates and a large amount of the palladium precipitates can be avoided. At the same time, substantially all of the base metals and the potassium chloride salt are dissolved. Thus, by filtering the remaining solids from the solution, a precipitate of a palladite can be obtained. By subjecting the precipitate to a second dissolution with a controlled amount of aqueous solutions, the palladium precipitate dissolves while the platinum precipitate remains insoluble. This result is quite surprising since it indicates that potassium chloroplatinite remains insoluble in the presence of dissolved potassium chloropalladites.

Using this approach, the platinum precipitate is filtered from the palladium solutions and dissolved separately in acidified water. The resulting platinum solutions are very clean and applicable for direct platinum refining. Thus, this procedure unexpectedly yields a highly selective dissolution between platinum and palladium. That is, separate streams of palladium and platinum can be obtained which will greatly reduce the complexity of subsequent platinum and palladium refining.

The aforementioned selective dissolution aspect of the invention involves subjecting the product from molten salt chlorination to a first dissolution preferably with acidified water having a pH ranging, for example, from about 0.2 to about 1.8, preferably 0.7 to about 1.2, and most preferably about 0.7 to about 1.0. The solids from the first dissolution are then subjected to a second dissolution preferably also with acidified water. Similarly, the solids from the second dissolution are subjected to dissolution preferably again with acidified water. While a three stage dissolution is preferable it may be conducted in two stages. By using the appropriate amount of acidified water in the first dissolution step, all of the palladium salt can be dissolved in addition to the base metals and the potassium chloride. After filtration, the residue from the first dissolution, which contains the potassium chloroplatinites, is subjected to a second dissolution step to dissolve the platinum salt.

The oxidation potential of the dissolution solutions of the first and second dissolutions, in the case of three dissolution steps, or just the first solution, in the case of two dissolution steps, should be kept at around 400 mv to 500 mv as measured against a standard silver electrode, preferably about 420mv to 480 mv, and most preferably 440 mv to 460 mv.

The oxidation potential of the first solution produced by the dissolutions (by any of the methods), should then be raised to a value ranging from about 800 mv to about 1200 mv, preferably >1000 mv. At this level the PGMs precipitate. Substantially all of the precipitate will be palladium complexes The oxidation potential of the solution can be raised, for example, by introducing chlorine gas.

The oxidation potential of the solution from the second dissolution, in the case of using a three dissolution steps is also raised to preferably >1000 mv. In addition, potassium chloride is added to a concentration of 2 molar. Subsequently, the PGMs will precipitate. Substantially all of the precipitates will be palladium complexes.

Additional salt is also added to the solution of potassium chloroplatinites (from the third dissolution step when using three dissolution steps or the second dissolution step when using two dissolution steps). Salt should be added in an amount sufficient to provide a potassium chloride concentration of about 1 to 2 molar.

The following detailed Examples are presented as specific illustrations of the presently claimed invention. It should be understood, however, that the invention is not limited to the specific details set forth in the Examples.

EXAMPLE 1

This Example demonstrates that by using molten salt chlorination a high level of extraction of precious metals and nickel can be obtained. Less than 1% of the precious metals will be lost in the vapors and the impurities arsenic, tellurium, antimony, selenium and tin separate from the precious metal stream by volatilization from the melt. In addition, it will demonstrate a high level of extraction for secondary PGMs such as rhodium and iridium.

Three hundred grams of a $KCl/MgCl_2$ mixture were loaded into a glass reactor vessel and heated to 550° C. to form a melt. 300 grams of ground nickel matte were charged into the melt, with the matte having a composition of 6600g/tonne Pt, 20950 g/tonne Pd, 364 g/tonne Au, 177 g/tonne Rh, 18 g/tonne Ir, 31.7% Cu, 41.0% Ni, 1.8% Fe, 35 ppm As, 43 ppm Sb, 360 ppm Se, 310 ppm Te and 700 ppm Sn.

The molten salt and ground matte in the form of a molten slurry were stirred constantly and the temperature of the molten slurry was brought to 550° C. At that temperature, chlorine was injected into the bottom of the melt through the hollow shaft of a reactor stirrer. The chlorine injection rate was maintained at 1 liter/minute for 2 hours and 10 minutes. During the injection of chlorine, 300 grams of granular KCl salt was added in increments of 50 grams every 10 min.

During the run, sulfur vapors, metal chlorides and some chlorine evolved from the melt and were led from the reactor and into a spray absorption vessel. The absorption vessel also served as a condenser for sulfur. The solutions of the absorber were kept slightly acidic (1% HCl) to avoid hydrolysis of metal chlorides.

At the end of the run, the melt was poured into a mold, and cooled to room temperature to form a solid chloride product. The solid chloride product was then crushed, and leached with 3.5 liters of 1% hydrochloric acid that contained 1 g/liter of dissolved chlorine. The solid residue was then separated from the leaching solutions by filtration.

The leaching solutions, absorption vessel solutions and the solid residue were analyzed for metal content. Table 1A shows the total amount of precious and base metal extraction that was achieved. Table 1B shows the extraction of the impurities.

TABLE 1A

| % Extraction | | | | | | | |
|---|---|---|---|---|---|---|---|
| Pt | Pd | Au | Rh | Ir | Ni | Cu | Fe |
| 99.4 | 99.6 | 99.8 | 99.4 | 100.0 | 100.0 | 100.0 | 95.8 |

TABLE 1B

| % Extraction | | | | |
|---|---|---|---|---|
| As | Sb | Se | Te | Sn |
| 100.0 | 100.0 | 100.0 | 95.0 | 100.0 |

As may be seen from the above Table, the process extracted more than 99% of all of PGMs and achieved high extractions for the base metals and impurities, as well.

Tables 1C and 1D set forth the distribution of metals in the various process streams. It can be seen from Table 1C that the precious metal values were substantially all extracted into the leaching solutions, and that the losses of metals due to evaporation from the melt into the absorption vessel were minimal. Table 1D shows that the impurities were substantially all extracted into the overhead condenser and thus separated from the precious metals.

TABLE 1C

| | % Distribution | | | | | | | |
|---|---|---|---|---|---|---|---|---|
| | Pt | Pd | Au | Rh | Ir | Ni | Cu | Fe |
| Feed | 100 | 100 | 100 | 100 | 100 | 100 | 100 | 100 |
| Tailing | 0.6 | 0.4 | 0.2 | 0.6 | <0.01 | 0.01 | <0.01 | 4.2 |

TABLE 1C-continued

| | % Distribution | | | | | | | |
|---|---|---|---|---|---|---|---|---|
| | Pt | Pd | Au | Rh | Ir | Ni | Cu | Fe |
| Leaching Solutions | 99.39 | 99.59 | 99.78 | 99.35 | 99.95 | 99.9 | 99.9 | 94.4 |
| Overhead condenser and Sulfur | 0.01 | 0.01 | 0.02 | 0.05 | 0.05 | 0.06 | 0.1 | 1.39 |

TABLE 1D

| | % Distribution | | | | |
|---|---|---|---|---|---|
| | As | Sb | Se | Te | Sn |
| Feed | 100 | 100 | 100 | 100 | 100 |
| Tailing | <0.01 | <0.01 | <0.01 | 5.0 | <0.01 |
| Leaching Solutions | <0.1 | <0.1 | <0.1 | 15.0 | <0.1 |
| Overhead condenser and Sulfur | 100 | 100 | 100 | 80 | 100 |

EXAMPLE 2

This Example demonstrates that the extraction of gold can be prevented while extracting all of the PGMs and base metals. Such a separation is important because it simplifies the ultimate refining of PGMs.

Three hundred grams of a $KCl/MgCl_2$ mixture were loaded into a glass reactor vessel and heated to 550° C. 300 grams of ground nickel matte were then charged into the melt, the matte having a composition of 5460 g/tonne Pt, 16800 g/tonne Pd, 271 g/tonne Au, 141 g/tonne Rh, 22.4% Cu, 32.4% Ni, 15.0% Fe.

The molten salt and ground matte in the form of a molten slurry were stirred constantly and the temperature of the molten slurry was brought to 550° C. At that temperature chlorine was injected into the bottom of the melt through the hollow shaft of a reactor stirrer. 116 liters of chlorine we re injected into the melt at a rate of 1 liter/minute. During the injection of chlorine, 300 grams of granular KCl salt were added in increments of 50 grams per 10 minutes During the run, sulfur vapors, metal chlorides and some chlorine evolved from the melt. They were led from the reactor and into a spray absorption vessel. The absorption vessel also served as a condenser for sulfur. The solutions of the absorber were maintained acidic (1% HCl) to avoid hydrolysis of metal chlorides.

At the end of the run, the melt was poured into a mold, and cooled to room temperature to form a solid chloride product. The solid chloride product was then crushed, and leached with 5 liters of acidic solution (pH 0.7) that did not contain dissolved chlorine. The solid residue was then separated from the leaching solution by filtration.

The leaching solutions, absorption vessel solutions and the solid residue were analyzed for metal content. Table 2A shows the total amount of metal extraction that was achieved.

TABLE 2A

| % Extraction | | | | | | | |
|---|---|---|---|---|---|---|---|
| Pt | Pd | Au | Rh | Ni | Cu | Fe | S |
| >99.9 | >99.9 | 0.0 | 99.6 | 99.1 | 100.0 | 95.1 | >99.9 |

As may be seen from the results above, the process extracted 99.9% of all of the PGMs and achieved high extractions for the base metals. In this run, the gold was not extracted and it was retained in the solid residue.

Table 2B shows the distribution of metals in the various process streams. It shows that substantially all of the PGM values were extracted into the leaching solutions and that the losses of metals due to evaporation from the melt into the absorption vessel were minimal.

TABLE 2B

| | % Distribution | | | | | | |
|---|---|---|---|---|---|---|---|
| | Pt | Pd | Au | Rh | Ni | Cu | Fe |
| Feed | 100 | 100 | 100 | 100 | 100 | 100 | 100 |
| Tails | 0.09 | 0.07 | >99.9 | 0.58 | 0.97 | <0.01 | 6.21 |
| Leaching Solutions | 99.95 | 99.97 | 1.24 | >99.9 | 99.4 | >99.9 | 66.26 |
| Overhead Condenser and sulfur | <0.01 | <0.01 | 0.03 | <0.01 | <0.01 | <0.01 | <0.01 |

EXAMPLE 3

This Example demonstrates that the invention can provide selective separation between platinum and palladium by precipitating the PGMs from the leaching solutions followed by subsequent treatment of the PGM precipitates.

Precipitation of the PGMs from the leaching solution of Example 2 was carried out by injecting chlorine into the solution. The Eh of the leaching solution before chlorine treatment was 470 mv as measured by a standard silver electrode. Precipitation of the PGMs occurred when the Eh of the solution was raised to 1100 mv The Eh of the solution was monitored during chlorine injection until the desired level was reached. The precipitates were then filtered and dried. Using X-ray diffraction the precipitates were determined to contain potassium chloro-complexes of palladium, platinum, rhodium, iridium, ruthenium and osmium. The yield of the precipitation was surprisingly high as illustrated in Table 3A. The precipitation of PGMs from the leaching brines was found to be selective and quantitative.

TABLE 3A

| YIELD OF METALS BY PRECIPITATION (%) | | | | | |
|---|---|---|---|---|---|
| Pt | Pd | Rh | Fe | Ni | Cu |
| 99.3 | 99.9 | 93.3 | <0.1 | <0.1 | <0.1 |

The PGM precipitate was then calcined at 450° C., wherein the palladium chloropalladates decomposed to soluble palladium chloropalladite compounds, while the platinum complex remained as platinates which are not significantly soluble. The calcined mixed precipitates were then leached with acidified water (pH 0.7). The PGM products were then separated into a palladium rich stream and a platinum rich stream. The degree of extraction of metals into the streams, and the composition of the solutions are set forth in Tables 3B and 3C. respectively. It can be seen that good separation of platinum and palladium can be obtained with low levels of metal impurities.

TABLE 3B

| | METAL EXTRACTION (%) | | | |
|---|---|---|---|---|
| Stream | Pt | Pd | Rh | Fe,Ni,Cu |
| Pt | 87.1 | 0.1 | 6.7 | <0.01 |
| Pd | 11.7 | 99.5 | 85.9 | <0.01 |
| Other | 1.1 | 0.4 | 7.5 | >99.9 |

TABLE 3C

| | METALS IN SOLUTION (ppm) | |
|---|---|---|
| Metals | Pt Stream | Pd Stream |
| Pt | 2680.0 | 272 |
| Pd | 10.0 | 7520 |
| Rh | 6.0 | 96.4 |
| Fe | <2.0 | <2.0 |
| Ni | <1.6 | <1.6 |
| Cu | <1.6 | <1.6 |

EXAMPLE 4

This Example demonstrates that selective separation between platinum and palladium can be obtained by leaching the solidified chloride products in sequential steps. Sequential leaching yields unexpected high recoveries of Pt and Pd in their segregated streams.

Three hundred grams of a KCl/MgCl$_2$ mixture were loaded into a glass reactor vessel and heated to 550° C. 300 grams of ground nickel matte was charged into the melt. The matte had the same composition as that used in Example 2.

The molten salt and ground matte in the form of a molten slurry were stirred constantly and the temperature of the molten slurry was brought to 550° C. At that temperature chlorine was injected into the bottom of the melt through the hollow shaft of a reactor stirrer. 116 liters (STP) of chlorine were injected into the molten slurry at a rate of 1 liter/minute. During the injection of chlorine, 300 grams of granular KCl salt was added in increments of 50 grams per 10 minutes.

During the run, sulfur vapors, metal chlorides and some chlorine evolved from the melt and were led from the reactor and into a spray absorption vessel. The absorption vessel also served as a condenser for sulfur. The solutions of the absorber were maintained acidic (1% HCl) to avoid hydrolysis of metal chlorides.

At the end of the run, the melt was poured into a mold, cooled to room temperature to form a solid chloride product, crushed, and leached with 2.5 liter of dilute hydrochloric acid (pH 0.7). The solid residue was then separated from the leaching solutions by filtration and the filtered solids were leached with an additional 1.5 liters of fresh dilute hydrochloric acid (pH 0.7). This procedure was repeated one more time, this time using 1 liter of acidified water.

The three leaching solutions, the absorption vessel solution and the solid residue were analyzed for their metal content. The amount of metal extraction and the distribution of the products are set forth in Tables 4A and 4B.

TABLE 4A

| % EXTRACTION INTO AQUEOUS STREAMS | | | | | | | |
|---|---|---|---|---|---|---|---|
| Pt | Pd | Au | Rh | Ni | Cu | Fe | S |
| 99.9 | 99.9 | 0.0 | 99.9 | 99.8 | 99.9 | 76.4 | 0.004 |

TABLE 4B

| | % METAL DISTRIBUTION | | | | | | |
|---|---|---|---|---|---|---|---|
| | Pt | Pd | Au | Rh | Cu | Ni | Fe |
| Feed | 100 | 100 | 100 | 100 | 100 | 100 | 100 |
| Leach 1 | <0.01 | 47.2 | 0.4 | 67.0 | 94.8 | 93.9 | 71.7 |
| Leach 2 | 2.2 | 52.6 | <0.01 | 8.3 | 4.6 | 4.3 | 3.5 |
| Leach 3 | 97.6 | 0.1 | <0.01 | 24.6 | <0.01 | 0.01 | 0.1 |
| Residue | 0.06 | 0.04 | 99.6 | 0.1 | 0.01 | 1.3 | 24.0 |
| Other streams | 0.1 | 0.1 | <0.01 | <0.01 | 0.9 | 0.6 | 0.64 |

After leaching, the PGMs were precipitated from leaching solutions 1 and 2 by increasing the oxidation potential of the solutions from around 50 mv to about 1100 mv. 160 grams of KCl were added to leaching solution No. 2 to complete the precipitation. X-ray analysis showed that both precipitates were predominately a potassium chloropalladate complex. The minor metals in the precipitate were rhodium, iridium, osmium, and ruthenium. The PGM precipitates from leaching solutions 1 and 2 were combined and calcined at 450° C. to convert the potassium palladate salt to the more soluble palladite form. This increased the solubility of the secondary PGMs, as well. After calcination, the precipitates were dissolved to form a palladium rich stream. The platinum rich stream was original leaching solution 3. The degree of extraction of the various metals into the various streams is shown in Table 4C.

TABLE 4C

| | % EXTRACTION | | | | | |
|---|---|---|---|---|---|---|
| Stream | Pt | Pd | Rh | Ni | Cu | Fe |
| Platinum | 97.35 | <0.1 | 11.5 | <0.01 | <0.01 | <0.01 |
| Palladium | 2.2 | 99.8 | 72.7 | <0.01 | <0.01 | <0.01 |
| Other Streams | 0.6 | 0.2 | 15.8 | >99.9 | >99.9 | >99.9 |

From the above, it can be seen that the process provides excellent separation between platinum and palladium, even better than that illustrated in the previous Example. The composition of the solutions is set forth below in Table 4D. It can be seen from the Table that the purity of the platinum and palladium solutions is high. There were no appreciable amounts of arsenic, antimony, tellurium, selenium, bismuth and tin impurities in the product streams. The platinum solution had high levels of iron, nickel, and silica.

TABLE 4D

| | METAL CONCENTRATION (ppm) | |
|---|---|---|
| METALS | PALLADIUM SOLUTION | PLATINUM SOLUTION |
| Pt | 72.0 | 1310.0 |
| Pd | 10400.0 | 5.7 |
| Rh | 47.2 | 7.8 |
| Ir | 3.67 | 0.1 |
| Al | 1.4 | 7.5 |

TABLE 4D-continued

| METALS | METAL CONCENTRATION (ppm) | |
|---|---|---|
| | PALLADIUM SOLUTION | PLATINUM SOLUTION |
| As | >0.05 | 0.9 |
| B | 1.2 | 1.8 |
| Cu | 6.0 | 7.9 |
| Fe | 5.1 | 241.0 |
| Ni | 3.1 | 33.3 |
| P | 1.7 | 2.0 |
| Si | 2.2 | 60.8 |

EXAMPLE 5

This Example demonstrates the quality of the platinum stream from Example 4 can even be further improved according to another aspect of the invention.

165 g of KCl was added to 1200 cc of the platinum solution generated from leach 3 of Example 4. As the KCl dissolved, a precipitate of PGMs was formed. The precipitate was filtered, and dried at 100° C. The precipitate was then dissolved in 450 cc of acidified water (pH 0.7) to generate a refined platinum solution. This technique removed the major impurities from the platinum solution. The results are set forth in Table 5.

TABLE 5

| Metals | Concentration (ppm) |
|---|---|
| Pt | 3680.0 |
| Pd | 2.7 |
| Rh | 8.8 |
| Ir | 1.4 |
| Al | 1.6 |
| As | 2.2 |
| Cu | 0.02 |
| Fe | 0.2 |
| Ni | <0.04 |
| P | 2.0 |
| Si | 3.4 |

EXAMPLE 6

This Example demonstrates another aspect of the invention, namely that gold can be extracted at a later stage in processing and separately from the PGMs.

A 100 gram composite of tailings from the previous Examples was prepared. The composite contained 29 ppm Pt, 87 ppm Pd, 4342 ppm Au, 3.0 ppm Th, 3.1% Ni, 168 ppm Cu, 24.5% Fe, 26.63% Si. The composite was mixed with a 300 cc sample of solution from the first leaching solution of Example 4. The solution was acidic (pH 0.50) and contained <0.2 ppm Pt, 1.2 ppm Pd, 0.08 ppm Au, 0.8 ppm Rh, 32.4 g/liter Ni, 22.4 g/liter Cu, 9.24 g/liter Fe, and 156 g/liter KCl.

The Eh of the solution was 1100 mv as measured relative to a standard silver electrode. The mixture was stirred for three hours at 50° C. and the Eh maintained constant. The tailings were then separated from the solution by filtration. The solution and solids were then analyzed and the metal extraction calculated. The results are set forth in Table 6.

TABLE 6

| | Pt | Pd | Au | Rh |
|---|---|---|---|---|
| Feed (ppm) | 29 | 87 | 4342 | 3.0 |
| Tails (ppm) | 20.5 | 20.8 | 1.8 | 0.9 |
| Extraction (%) | 41.6 | 80.3 | 99.9 | 75.4 |

EXAMPLE 7

This Example demonstrates that the PGMs which did not precipitate from leach 1 of Example 4 can be essentially fully recovered from the solution using a chelating ion exchange technique.

3.5 liters of solution was passed over an ion exchange column that was specific for precious metals. The ion exchange material was a thiouronium chelating resin which is marketed by Sela Inc. under the tradename PAZ. The solution was passed through a 100 cc column over the resin at a rate of 200 cc/hr. The results are set forth in Table 7.

TABLE 7

| Stream | Pt | Pd | Au | Rh | Fe | Cu | Ni |
|---|---|---|---|---|---|---|---|
| Feed (ppm) | 0.8 | 2.0 | 21.6 | 0.4 | 1168 | 19740 | 29500 |
| Raffinate (ppm) | <0.1 | <0.02 | <0.02 | 0.16 | 1184 | 21080 | 29000 |
| Extraction (%) | >99.9 | >99.9 | >99.9 | 60 | <0.01 | <0.01 | <0.01 |

EXAMPLE 8

This Example demonstrates that the PGMs which were not precipitated from leach 1 of Example 4 can be recovered by adsorption an activated carbon. 50 cc of a sample solution containing PGMs was contacted with 10 grams of activated carbon. The activated carbon was type PCB 6*16 marketed by Calgon Corporation. The results are set forth in Table 8.

TABLE 8

| Stream | Pt | Pd | Au | Rh |
|---|---|---|---|---|
| Feed (ppm) | 615 | 1900 | 190 | 80 |
| Raffinate (ppm) | <0.2 | 1.45 | >0.04 | 0.85 |
| Extraction (%) | >99.9 | 99.9 | >99.9 | 98.9 |

The foregoing description of the invention in primary part portrays particular preferred embodiments in accordance with the requirements of the patent statutes and for purposes of explanation and illustration. It will be apparent, however, to those skilled in the art, that many modifications and changes in the specifically described methods may be made without departing from the scope and spirit of the invention. It is applicant's intention in the following claims to cover such modifications and variations as in the true spirit and scope of the invention.

What is claimed is:

1. A process for recovering precious metals from a precious metal containing source, said process comprising the steps of:
   a. contacting said source with a chloride salt containing at least one of potassium, cesium, or rubidium, whereby a mixture of said source and chloride salt is formed and wherein said source contains at least 0.1% iron;
   b. contacting said mixture with a chloride melt having a temperature ranging from 300° C. to 650° C.;
   c. contacting a chlorine containing gas with the melt;
   d. maintaining the salt concentration in the melt to an amount at least stoichiometrically equivalent to the amount of base metals and precious metals contained in the source by introducing into the melt a chloride salt containing at least one of potassium, cesium or rubidium, but not sodium or lithium until substantially all of the precious metals are formed into precious metal chlorides; and e. leaching said precious metals from the product of step "d" wherein a pregnant brine containing the precious metals is produced.

2. A process for recovering precious metals according to claim 1, wherein the precious metal source is matte.

3. A process for recovering precious metals from matte according to claim 2 wherein said matte is a ground converter matte.

4. A process for recovering precious metals from matte according to claim 3, wherein said matte is a nickel containing matte.

5. A process for recovering precious metals from matte according to claim 2, wherein said matte is obtained from a precious metal containing sulfide ore.

6. A process for recovering precious metals from matte according to claim 5, wherein prior to molten salt chlorination the sulfide ore has been smelted thereby producing a gangue phase and a matte phase containing precious metals and copper, nickel and iron sulfides, said matte phase then being treated in a converter to remove iron therefrom, then cooled, then crushed and then ground.

7. A process for recovering precious metals from matte according to claim 6, wherein after grinding the matte is introduced into an autoclave to remove copper and nickel and produce a matte residue enriched in gold and PGMs.

8. A process according to claim 1, wherein the stoichiometry is maintained by adding potassium chloride.

9. A process according to claim 8, wherein the melt contains potassium chloride and magnesium chloride.

10. A process according to claim 9, wherein prior to introducing the source into the melt the melt contains sodium chloride and at least one of magnesium chloride and calcium chloride.

11. A process according to claim 1, wherein the melt contains less than 15% of an iron chloride promoter.

12. A process according to claim 2, wherein the matte/salt solids mixture is contacted with the melt at a temperature ranging from about 350° C. to about 550° C.

13. A process according to claim 2, wherein at least about 99% of the precious metals is recovered from the matte.

14. A process according to claim 12 wherein the matte and the melt form a molten salt product and wherein at least 99% of the precious metals is retained in the molten salt product stream.

15. A process according to claim 2 wherein the chlorine containing gas is 100% chlorine gas ($Cl_2$).

16. A process according to claim 1, further comprising monitoring the degree of chlorination of PGM's by obtaining a sample from the melt, dissolving the sample in acidified water and measuring the oxidation potential of the resulting solution.

17. A process for recovering precious metals from matte according to claim 2, further comprising raising the oxidation potential of said pregnant brine to a level ranging from about 900 mv to about 1100 mv against a standard silver electrode to produce a precipitate.

18. A process for recovering precious metals from matte according to claim 2, wherein the resulting molten salt product stream contains PGM chlorides which are soluble in potassium chloride containing brines.

19. A process according to claim 15, further comprising heating the precipitate to a temperature sufficient to decompose potassium chloropalladate to potassium chloropallidite, followed by leaching.

20. A process according to claim 19 wherein palladium is leached from the platinum and palladium containing precipitate, the leachate being substantially free of platinum.

21. A process according to claim 20, wherein substantially all of the palladium is leached from the precipitate.

22. A process according to claim 1, wherein gold is not chlorinated.

23. A process for recovering precious metals from a precious metal containing source, said process comprising subjecting the source to molten salt chlorination, wherein the source is contacted with a chloride salt to form a matte/salt solids mixture, the solids mixture is introduced into a chloride melt having a temperature ranging from 300° C. to 650° C., and wherein a chlorine containing gas is injected into the melt while maintaining the salt concentration at least at an amount stoichiometrically equivalent to the amount of base metals and precious metals contained in the matte, wherein both platinum and palladium, as well as rhodium, iridium, osmium and ruthenium are dissolved.

24. A process for recovering precious metals from matte according to claim 2, further comprising subjecting the product from the molten salt chlorination to dissolution to selectively recover platinum and palladium, said dissolution comprising (i) contacting the platinum and palladium containing solid with a dissolution medium of acidified water having a pH ranging from about 0.2 to about 1.8, adjusting the oxidation potential of the resulting medium, and adding potassium chloride to the resulting medium, the adjustment and addition being to levels sufficient to provide a precipitate containing palladium and substantially no platinum; (ii) contacting the remaining solids from step (i) with a dissolution medium of acidified water having a pH ranging from about 0.2 to about 1.8, adjusting the oxidation potential of the resulting medium and adding potassium chloride to the resulting medium, the adjustment and addition being to levels sufficient to provide a precipitate containing palladium and substantially no platinum; (iii) contacting the remaining solids from step (ii) with a dissolution medium of acidified water having a pH ranging from about 0.2 to about 1.8, and adjusting the oxidation potential of the resulting medium to a level sufficient to provide a precipitate, said precipitate containing platinum and substantially no palladium.

25. A process for recovering precious metals from matte according to claim 9, further comprising subjecting the product from the molten salt chlorination to dissolution to selectively recover platinum and palladium, said dissolution comprising (i) contacting the platinum an palladium containing solid with a dissolution medium of acidified water having a pH ranging from about 0.2 to about 1.8, adjusting the oxidation potential of the resulting medium, and adding potassium chloride to the resulting medium, the adjustment and addition being to levels sufficient to provide a precipitate containing palladium and substantially no platinum; (ii) contacting the remaining solids from step (i) with a dissolution medium of acidified water having a pH ranging from about 0.2 to about 1.8, adjusting the oxidation potential of the resulting medium and adding potassium chloride to the resulting medium, the adjustment and addition being to levels sufficient to provide a precipitate containing palladium and substantially no platinum; (iii) contacting the remaining solids from step (ii) with a dissolution medium of acidified water having a pH ranging from about 0.2 to about 1.8, and adjusting the oxidation potential of the resulting medium to a level sufficient to provide a precipitate, said precipitate containing platinum and substantially no palladium.

26. A process for recovering precious metals from matte according to claim 2, further comprising subjecting the product from the molten salt chlorination to dissolution to selectively recover platinum and palladium, said dissolution comprising (i) contacting the platinum and palladium containing product with a dissolution medium and (ii) subjecting the remaining solids from step (i) to at least one additional treatment with a dissolution medium, wherein the oxidation potential of the dissolution medium from step (i) is adjusted to a level, and a salt selected from at least one of potassium chloride, rubidium chloride, and cesium chloride, is added in amounts sufficient to provide a palladium containing precipitate which contains substantially no platinum.

27. A process for recovering precious metals from matte according to claim 19, further comprising subjecting the product from the molten salt chlorination to dissolution to selectively recover platinum and palladium, said dissolution comprising (i) contacting the platinum and palladium containing product with a dissolution medium and (ii) subjecting the remaining solids from step (i) to at least one additional treatment with a dissolution medium, wherein the oxidation potential of the dissolution medium from step (i) is adjusted to a level, and a salt selected from at least one of potassium chloride, rubidium chloride, and cesium chloride, is added in amounts sufficient to provide a palladium containing precipitate which contains substantially no platinum.

28. A process for recovering precious metals from matte, said process comprising subjecting a matte to molten salt chlorination, wherein the melt contains potassium chloride and magnesium chloride and has a temperature ranging from 300° C. to 650° C., said melt further containing at least 0 1%, but less than about 15% iron chloride, and wherein a chlorine gas is injected into the melt while maintaining the salt concentration at least at a amount stoichiometrically equivalent to the amount of base metals and precious metals contained in the matte.

29. A process for recovering precious metals from matte according to claim 27, further comprising subjecting the product from the molten salt chlorination to dissolution to selectively recover platinum and palladium, said dissolution comprising (i) contacting the platinum and palladium containing solid with a dissolution medium of acidified water having a pH ranging from about 0.2 to about 1.8, adjusting the oxidation potential of the resulting medium, and adding potassium chloride to the resulting medium, the adjustment and addition being to levels sufficient to provide a precipitate containing palladium and substantially no platinum; (ii) contacting the remaining solids from step (i) with a dissolution medium of acidified water having a pH ranging from about 0.2 to about 1.8, adjusting the oxidation potential of the resulting medium and adding potassium chloride to the resulting medium, the adjustment and addition being to levels sufficient to provide a precipitate containing palladium and substantially no platinum; (iii) contacting the remaining solids from step (ii) with a dissolution medium of acidified water having a pH ranging from about 0.2 to about 1.8, and adjusting the oxidation potential of the resulting medium to a level sufficient to provide a precipitate, said precipitate containing platinum and substantially no palladium.

* * * * *

UNITED STATES PATENT AND TRADEMARK OFFICE
CERTIFICATE OF CORRECTION

PATENT NO. : 5,238,662
DATED : August 24, 1993
INVENTOR(S) : Michael Dubrovsky

It is certified that error appears in the above-identified patent and that said Letters Patent is hereby corrected as shown below:

Claim 28, Col. 22, line 8:        "least 0 1%, but" should read
                                   --least 0.1%, but--

Signed and Sealed this

Sixteenth Day of August, 1994

Attest:

Attesting Officer

BRUCE LEHMAN

Commissioner of Patents and Trademarks